United States Patent
Sasson et al.

(10) Patent No.: US 7,428,281 B2
(45) Date of Patent: Sep. 23, 2008

(54) SYSTEM AND METHOD OF REMOVING DISCRETE SPURIOUS SIGNALS IN CABLE BROADBAND AND OTHER RF ENVIRONMENTS

(75) Inventors: Nir Sasson, Ein-Sarid (IL); Raanan Yechezkel, Milton Keynes (GB); Uri Garbi, Rosh-Ha' Ayin (IL); Alon Elhanati, Tel-Aviv (IL); Naftali Sommer, Rishon-Le-zion (IL)

(73) Assignee: Texas Instruments Incorporated, Dallas, TX (US)

( * ) Notice: Subject to any disclaimer, the term of this patent is extended or adjusted under 35 U.S.C. 154(b) by 822 days.

(21) Appl. No.: 10/930,459

(22) Filed: Aug. 31, 2004

(65) Prior Publication Data

US 2006/0045221 A1     Mar. 2, 2006

(51) Int. Cl.
    *H04B 1/10*      (2006.01)
(52) U.S. Cl. ..................................... 375/350
(58) Field of Classification Search ................ 375/350, 375/229, 232, 267, 316; 331/47
See application file for complete search history.

(56) References Cited

U.S. PATENT DOCUMENTS

| | | | | |
|---|---|---|---|---|
| 4,878,027 A | * | 10/1989 | Carp et al. ................. | 327/105 |
| 5,195,105 A | * | 3/1993 | Hashimoto et al. .......... | 375/150 |
| 5,394,117 A | * | 2/1995 | Cohen .......................... | 331/47 |
| 5,521,533 A | * | 5/1996 | Swanke ...................... | 327/107 |
| 5,574,986 A | * | 11/1996 | Mobach ....................... | 455/76 |
| 5,579,341 A | * | 11/1996 | Smith et al. ................. | 375/267 |
| 5,604,769 A | * | 2/1997 | Wang .......................... | 375/229 |
| 5,734,577 A | * | 3/1998 | Chesir et al. ................. | 342/159 |
| 6,215,828 B1 | * | 4/2001 | Signell et al. ............... | 375/316 |
| 6,570,917 B1 | * | 5/2003 | Lai et al. ..................... | 375/232 |
| 7,292,631 B2 | * | 11/2007 | Gregorius .................... | 375/232 |
| 7,305,026 B1 | * | 12/2007 | Citta et al. ................... | 375/229 |
| 2001/0050966 A1 | * | 12/2001 | Signell et al. ............... | 375/350 |
| 2002/0150169 A1 | * | 10/2002 | Kishi .......................... | 375/295 |

* cited by examiner

*Primary Examiner*—David C. Payne
*Assistant Examiner*—Leon-Viet Q Nguyen
(74) *Attorney, Agent, or Firm*—Steven A. Shaw; W. James Brady; Federick J. Telecky, Jr.

(57) ABSTRACT

A system and method of removing discrete spurious signals in cable broadband environments as well as in other RF environments employs either non-decision directed or decision directed techniques in order to remove the discrete spurious signals. The non-decision directed technique converts the signal of interest such that the spurious signal's frequency is approximately zero, filters out the converted spurious signal, and then reconverts the signal of interest back to its original location. The decision directed technique employs a decision mechanism such as a slicer to regenerate a spurious signal that is subtracted from the signal of interest containing the actual spurious signal such that the actual spurious signal is removed from the signal of interest.

18 Claims, 2 Drawing Sheets

SYSTEM AND METHOD OF REMOVING DISCRETE SPURIOUS SIGNALS IN CABLE BROADBAND AND OTHER RF ENVIRONMENTS

BACKGROUND OF THE INVENTION

1. Field of the Invention

This invention relates generally to cable broadband and other radio frequency (RF) environments, and more particularly to a system and method of removing discrete spurious signals in such environments.

2. Description of the Prior Art

The signal spectrum in cable broadband environments, as well as in other RF environments, often contains discrete spurious signals within the desired signal's bandwidth, or in proximity to that bandwidth. The source of such spurious signals may be clock harmonics, VCO harmonics, or inter-modulations of both, generated at the receiver, or induced from outside the system. These spurious signals, if strong enough, may impair the demodulator performance at the receiver. Further, these spurious signals may violate the specifications of communications standards, even if the performance of the system is not impaired.

In view of the foregoing, it is highly desirable and advantageous to provide a system and method of removing discrete spurious signals in cable broadband environments as well as in other RF environments.

SUMMARY OF THE INVENTION

The present invention is directed to a system and method of removing discrete spurious signals in cable broadband environments as well as in other RF environments. The technique employed may be either non-decision directed or decision directed.

According to one embodiment, a method of removing a discrete spurious signal from a signal of interest comprises the steps of:

a. determining whether the signal of interest is analog or digital;

b. sampling the signal of interest only when the signal of interest is not already a sampled signal;

c. frequency converting the sampled signal of interest such that the discrete spurious signal frequency is approximately zero;

d. filtering the frequency converted sampled signal of interest to eliminate the discrete spurious signal; and e. frequency converting the filtered signal of interest back to its original location.

The method may further comprise the step of converting the filtered frequency converted signal to an analog signal, if necessary or desired.

According to another embodiment, a system for removing a discrete spurious signal from a signal of interest, comprises:

a first frequency converter operational to convert a sampled signal of interest such that the discrete spurious signal frequency is approximately zero;

a high-pass filter operational to filter the frequency converted sampled signal of interest to eliminate the discrete spurious signal; and a second frequency converter operational to convert the filtered frequency converted sampled signal of interest back to its original location.

The embodiment may further employ a digital to analog converter to convert the digital signal to an analog signal, if necessary or desired.

According to yet another embodiment, a system for removing a discrete spurious signal from a signal of interest, comprises:

first frequency converting means for converting a sampled signal of interest such that the discrete spurious signal frequency is approximately zero;

filtering means for filtering the frequency converted sampled signal of interest to eliminate the discrete spurious signal; and second frequency converting means for converting the filtered frequency converted sampled signal of interest back to its original location.

According to still another embodiment, a method of removing a discrete spurious signal comprises the steps of:

processing a digitally modulated signal of interest, together with a spurious signal such that any inter-symbol interference is substantially eliminated, leaving only the signal of interest impaired by the spurious signal and some white noise;

processing the signal of interest impaired by the spurious signal and some white noise to generate a decision error comprising the spurious signal and the white noise;

regenerating the spurious signal and frequency and phase locking the regenerated spurious signal to the actual spurious signal in response to the decision error; and subtracting the regenerated spurious signal from the digitally modulated signal of interest and its associated spurious signal such that the spurious signal is removed from the signal of interest.

According to still another embodiment, a system for removing a discrete spurious signal comprises:

an equalizer operational to digitally modulate a signal of interest, together with a spurious signal such that any inter-symbol interference is substantially eliminated, leaving only the signal of interest impaired by the spurious signal and some white noise;

a decision mechanism operational to process the signal of interest impaired by the spurious signal and some white noise such that the difference between the equalizer output and the decision mechanism output is a decision error comprising the spurious signal and the white noise;

a spurious signal regenerator operational in response to the decision error to regenerate the spurious signal and to frequency and phase lock the regenerated spurious signal to the actual spurious signal; and an adder operational to subtract the regenerated spurious signal from the equalizer output such that the actual spurious signal is removed from the signal of interest.

According to still another embodiment, a system for removing a discrete spurious signal from a signal of interest comprises:

means for digitally modulating a signal of interest, together with a spurious signal such that any inter-symbol interference is substantially eliminated, leaving only the signal of interest impaired by the spurious signal and some white noise;

means for generating a decision error comprising the spurious signal and the white noise;

means for regenerating the spurious signal and further for frequency and phase locking the regenerated spurious signal to the actual spurious signal in response to the decision error; and means for subtracting the regenerated spurious signal from the signal of interest and its associated spurious signal such that the actual spurious signal is removed from the signal of interest.

According to still another embodiment, a method of removing a discrete spurious signal comprises the steps of:

processing a digitally modulated signal of interest, together with a spurious signal such that any inter-symbol interference is substantially eliminated, leaving only the signal of interest impaired by the spurious signal and some white noise;

processing the signal of interest impaired by the spurious signal and some white noise to generate a decision error comprising the spurious signal and the white noise;

regenerating the spurious signal in response to the decision error such that the regenerated spurious signal frequency matches the actual spurious signal frequency;

frequency shifting the digitally modulated signal of interest along with the spurious signal in response to the regenerated spurious signal;

filtering out the frequency shifted spurious signal; and frequency shifting the digitally modulated signal of interest back to its original frequency.

According to still another embodiment, a system for removing a discrete spurious signal comprises:

an equalizer operational to digitally modulate a signal of interest, together with a spurious signal such that any inter-symbol interference is substantially eliminated, leaving only the signal of interest impaired by the spurious signal and some white noise;

a decision mechanism operational to process the signal of interest impaired by the spurious signal and some white noise such that the difference between the equalizer output and the decision mechanism output is a decision error comprising the spurious signal and the white noise;

a spurious signal regenerator operational in response to the decision error to regenerate the spurious signal such that the regenerated spurious signal frequency matches the actual spurious signal frequency;

a first complex frequency converter operational to frequency shift the digitally modulated signal of interest along with the spurious signal in response to the regenerated spurious signal;

a high pass filter operational to filter out the frequency shifted spurious signal; and a second complex frequency converter operational to frequency shift the digitally modulated signal of interest back to its original frequency devoid of the spurious signal.

According to still another embodiment, a method of removing a discrete spurious signal from a desired signal comprises the steps of:

eliminating substantially any inter-symbol interference associated with the desired signal and the spurious signal;

generating a decision error subsequent to substantially eliminating the inter-symbol interference, wherein the decision error comprises the spurious signal;

regenerating the spurious signal in response to the decision error such that the spurious signal frequency matches the original spurious signal frequency and generating an output signal there from;

frequency shifting the desired signal along with the spurious signal in response to the PLL output signal;

filtering out the frequency shifted spurious signal; and frequency shifting the desired signal back to its original frequency.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The embodiments described herein below are directed to a system and method of removing discrete spurious signals in cable broadband environments as well as in other RF environments. The technique, as stated herein before may employ either non-decision directed or decision directed solutions. Keeping this in mind, a non-decision solution is first described with reference to FIGS. 1 and 2.

Non-Decision Directed Solution

Figure 1:
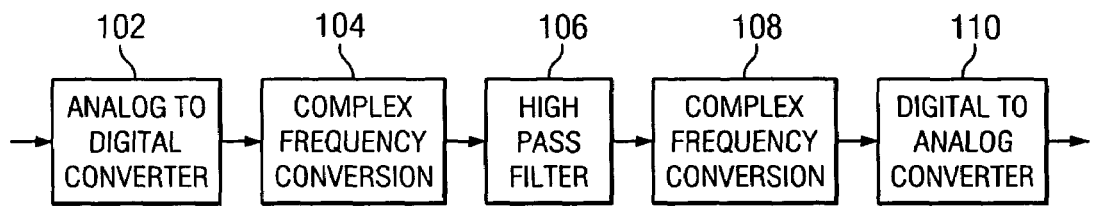
FIG. 1 is a block diagram illustrating a non-decision based system for removing discrete spurious signals according to one embodiment of the present invention.
Figure 2A:
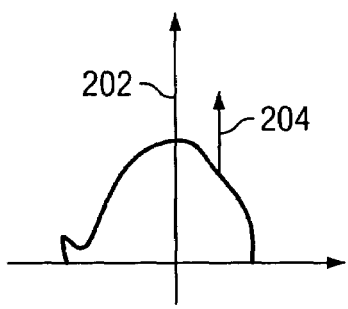
FIGS. 2a-2d are waveform diagrams illustrating removal of a discrete spurious signal from a broadband signal using the system shown in FIG. 1.
Figure 2B:
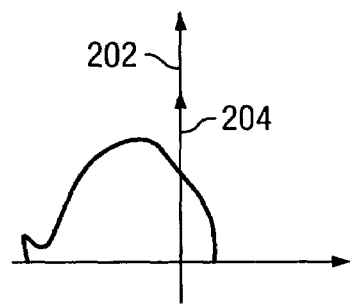
Figure 2C:
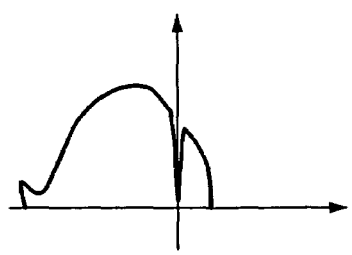
Figure 2D:
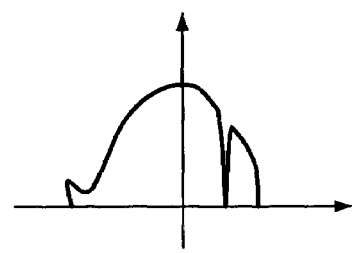

The non-decision directed solution may be applied to any signal, and most preferably relates to filtering spurious signals in the digital time domain. If the signal of interest is analog, it must first be sampled at a sufficient rate using, for example, an analog to digital converter 102 such as shown in FIG. 1. If the signal of interest is already a sampled (discrete time) signal, the foregoing sampling step is skipped. The sampled signal 202 shown in FIG. 2a is then frequency converted in such a way that the spurious signal's frequency is approximately zero. The present inventors found the foregoing frequency conversion generally to be a complex frequency conversion 104 such as shown in FIG. 1. FIG. 2b illustrates the sampled signal 202 together with the spurious signal 204 following the frequency conversion. The frequency converted sampled signal 202 together with the spurious signal 204 is then high-pass filtered 106 to eliminate the spurious signal such as shown in FIG. 2c. Those skilled in the signal filtering art will appreciate such filtration has to be narrow enough such that the desired signal will be left sufficiently unharmed. Subsequent to filtering, the filtered signal is then frequency converted 108 back to its original spectral location such as shown in FIG. 2d. If necessary or desired, the digital signal 202 is converted to an analog signal using a digital to analog converter 110 such as seen in FIG. 1. If more spurious signals exist, the foregoing scheme can be employed to also remove the additional spurious signals.

One preferred embodiment of the foregoing scheme is now described in more detail herein below. The sampled signal is first roughly converted in such a way that the spurious signal's frequency is nearly zero. The sampled signal is then introduced into a phase locked loop (PLL). The PLL operates to regenerate the spurious signal and to ensure the regenerated spurious signal frequency exactly matches the frequency of the original spurious signal; and its output is used to make yet another frequency conversion, correcting the rough previous conversion, and bringing the spurious signal's frequency exactly to zero. This frequency conversion process is associated with the first frequency conversion 104 as shown in FIG. 1. A simple narrow infinite impulse response (IIR) filter is then applied to eliminate the spurious signal. This IIR filter is associated with the high pass filter 106 shown in FIG. 1. This scheme, including a PLL, enables a very narrow band filter to be applied, thus minimizing the impairment inflicted on the desired signal.

Decision Directed Solution

In order to facilitate a better understanding of the decision directed solution discussed herein below, assume as discussed herein before, that a discrete spurious signal or a very narrow band interfering signal is within the bandwidth of the signal of interest. Assume further, that the signal of interest is already a digitally modulated signal, in some PSK, PAM or QAM scheme. Finally, assume that the signal of interest, together with the spurious signal, is received by a modem that contains an equalizer. As before, the equalizer is assumed to entirely eliminate the inter-symbol interference, leaving the desired signal impaired only by the spurious signal and white noise:

$$r_n = S_n + \text{spur}_n + AWGN_n, \text{ where } S_n \text{ is the desired signal.}$$

Figure 3:
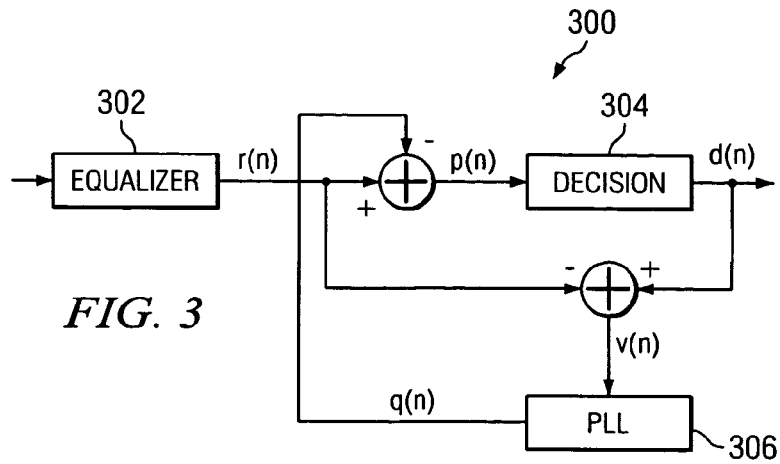
FIG. 3 is a block diagram illustrating a decision based system for removing discrete spurious signals according to one embodiment of the present invention.

FIG. 3 is a block diagram illustrating a decision based system 300 for removing discrete spurious signals, and that has an equalizer 302 for eliminating inter-symbol interference (ISI) according to one embodiment of the present invention. The equalizer 302 is followed by a decision mechanism 304, such as but not limited to, a slicer. The difference between the equalizer 302 output r(n) and the slicer output d(n) is the decision error v(n). Since there is no ISI, the error signal v(n) equals the spurious signal+noise. The spurious signal is regenerated with the same amplitude as the actual spurious signal, and frequency and phase locked to the actual spurious signal via a phase locked loop (PLL) 306. When all the foregoing is achieved, the regenerated spurious signal q(n) is subtracted from the equalizer output r(n) to remove the spurious content from the desired signal of interest. An approximation error associated with the foregoing procedure is then $$e_n = d_n - p_n.$$

One preferred embodiment of the decision directed solution is discussed herein below in more detail with which the adaptation of the PLL 306 is implemented. Two cases are discussed in order to facilitate a better understanding of the embodiments. The desired signal is real (e.g. PAM), in the first case. The desired signal is complex (e.g. QAM), in the second case.

Real Case:

Ignoring any additive white noise, the PLL 306 output is:

$$q_n = \tilde{A}_n \cos(\tilde{\phi}_n),$$

where $\tilde{A}_n$ is the estimated spurious amplitude, and $\tilde{\phi}_n$ is the estimated spurious phase at sample n. The actual spurious signal is:

$$A_n \cos(\phi_n).$$

The error signal can be formulated as:

$$e_n = d_n - p_n = \tilde{A}_n \cos(\tilde{\phi}_n) - A_n \cos(\phi_n),$$

where $\phi_n$ is composed of a temporary phase and the spurious signal's frequency:

$$\phi_n = n\omega_n + \phi_0.$$

The objective in the instant case is to minimize the mean square error:

$$J = E(e_n^2).$$

Assume first that the spurious frequency is known exactly. One preferred update method of the estimated parameters is the steepest decent method. Therefore:

$$\frac{\partial J}{\partial \tilde{A}_n} = 2e_n \frac{\partial e_n}{\partial \tilde{A}_n} = 2e_n \cos(\tilde{\phi}_n), \text{ and}$$

$$\frac{\partial J}{\partial \tilde{\phi}_n} = 2e_n \frac{\partial e_n}{\partial \tilde{\phi}_n} = -2e_n \tilde{A}_n \sin(\tilde{\phi}_n).$$

The recursive update formulae are:

$$\tilde{A}_{n+1} = \tilde{A}_n - \mu_1 \frac{\partial J}{\partial \tilde{A}_n} = \tilde{A}_n - \mu_1 e_n \cos(\tilde{\phi}_n), \text{ and}$$

$$\tilde{\phi}_{n+1} = \tilde{\phi}_n - \mu_2 \frac{\partial J}{\partial \tilde{\phi}_n} = \tilde{\phi}_n + \mu_2 e_n \tilde{A}_n \sin(\tilde{\phi}_n).$$

Thus, the regenerated spurious signal q(n) is:

$$q_n = \tilde{A}_n \cos \tilde{\phi}_n.$$

It can easily be seen that for the case where $\phi_n$=const (a DC offset only), this scheme is reduced to a simple IIR filtering of the error:

$$\tilde{A}_{n+1} = \tilde{A}_n - \mu_1 e_n,$$

whose output is subtracted from the equalizer's output just before the decision. When the spurious frequency is not known exactly, a similar solution using a second order loop is applied.

Complex Case:

Similarly to the real case discussed herein above:

$$q_n = \tilde{A}_n \exp(j\tilde{\phi}_n),$$

where $\tilde{A}_n$ and $\tilde{\phi}_n$ are real.

$$e_n = d_n - p_n = \tilde{A}_n \exp(j\tilde{\phi}_n) - A_n \exp(j\phi_n),$$

and $$e^*_n = \tilde{A}_n \exp(-j\tilde{\phi}_n) - A_n \exp(-j\phi_n).$$

The objective then is to minimize the mean squared error:

$$J = E(|e_n|^2) = E(e_n e_n^*)$$

Again, the assumption is made that the spurious frequency is known exactly. The preferred update method of the estimated parameters is the steepest descent method, as stated herein before. Therefore:

$$\frac{\partial J}{\partial \tilde{A}_n} = 2\text{Re}\left(e_n \frac{\partial e_n^*}{\partial \tilde{A}_n}\right)$$
$$= 2\text{Re}(e_n \exp(-j\tilde{\phi}_n))$$
$$= 2\text{Re}(e_n(\cos(\tilde{\phi}_n) - j\sin(\tilde{\phi}_n))),$$

$$\frac{\partial J}{\partial \tilde{\phi}_n} = 2\text{Re}\left(e_n \frac{\partial e_n^*}{\partial \tilde{\phi}_n}\right)$$
$$= 2\text{Re}(-je_n \tilde{A}_n \exp(-j\tilde{\phi}_n))$$
$$= 2\text{Re}(-je_n \tilde{A}_n(\cos(\tilde{\phi}_n) - j\sin(\tilde{\phi}_n))),$$

$$\frac{\partial J}{\partial \tilde{A}_n} = 2[\text{Re}(e_n)\cos(\tilde{\phi}_n) + \text{Im}(e_n)\sin(\tilde{\phi}_n)], \text{ and}$$

$$\frac{\partial J}{\partial \tilde{\phi}_n} = 2\tilde{A}_n[\text{Im}(e_n)\cos(\tilde{\phi}_n) - \text{Re}(e_n)\sin(\tilde{\phi}_n)];$$

and the recursive update formulae are:

$$\tilde{A}_{n+1} = \tilde{A}_n - \mu_1 \frac{\partial J}{\partial A_n}, \text{ and}$$

$$\tilde{\phi}_{n+1} = \tilde{\phi}_n - \mu_2 \frac{\partial J}{\partial \phi_n}.$$

Thus, the regenerated spurious signal q(n) is:

$$q_n = \tilde{A}_n \exp(j\tilde{\phi}_n),$$

which is the desired result.

When the spurious frequency is not known exactly, a similar solution using a second order loop is applied, as stated herein before.

Figure 4:
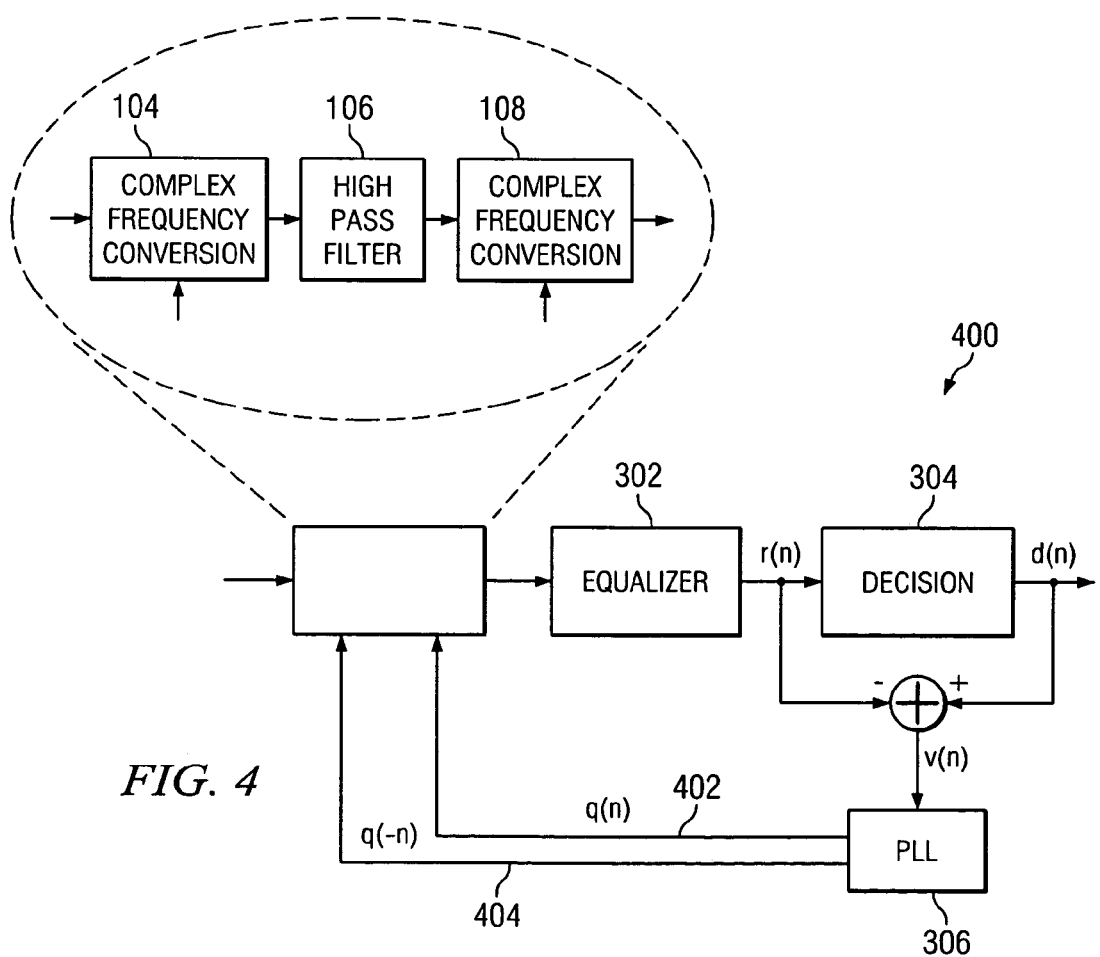
FIG. 4 is a block diagram illustrating a decision based system for removing discrete spurious signals according to another embodiment of the present invention.

The present invention is not so limited however, and it shall be understood that although the spurious signal is being subtracted in the embodiments described herein before with reference to FIG. 3, the embodiment shown in FIG. 3 can just as easily be adapted to regenerate the spurious signal via the PLL 306 such that the regenerated spurious signal frequency matches the original spurious signal frequency, and then to use the PLL's output to frequency shift the desired signal along with the spurious signal, filter out the spurious signal, and then frequency shift the desired signal back to its original frequency. One such embodiment is shown in FIG. 4, wherein a block diagram illustrates a decision based system 400 for removing discrete spurious signals, and that also has an equalizer 302 for eliminating inter-symbol interference (ISI) according to another embodiment of the present invention. Decision based system 400 is similar to decision based system 300. The PLL 306 employed in decision based system 400 however, can be seen to generate two distinct outputs, q(n) 402 and q(-n) 404. These outputs 402, 404 are running at opposite frequencies and are generated via two distinct numerically controlled oscillators (NCOs) controlled by the PLL loop in which q(-n) can be used as the loop NCO. A complex frequency conversion 104 is performed on the output signals 402, 404 in order to frequency shift the desired signal along with the spurious signal. A high pass filter 106 then filters out the spurious signal associated with the frequency shifted signal. Finally, the desired signal is frequency shifted back to its original frequency using a second complex frequency conversion 108. It should be noted that preserving the phase is optional and not absolutely required when filtering out the spurious signal.

In view of the above, it can be seen that the present invention presents a significant advancement in the art of broadband noise reduction. This invention has been described in considerable detail in order to provide those skilled in the cable broadband and radio frequency arts with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of removing a discrete spurious signal, the method comprising the steps of:
   processing a digitally modulated signal of interest, together with a spurious signal such that any inter-symbol interference is substantially eliminated, leaving only the signal of interest impaired by the spurious signal and some white noise;
   processing the signal of interest impaired by the spurious signal and some white noise to generate a decision error comprising the spurious signal and the white noise;
   regenerating the spurious signal in response to the decision error such that the regenerated spurious signal frequency matches the actual spurious signal frequency;
   frequency shifting the digitally modulated signal of interest along with the spurious signal in response to the regenerated spurious signal;
   filtering out the frequency shifted spurious signal; and
   frequency shifting the digitally modulated signal of interest back to its original frequency.

2. The method according to claim 1, wherein the step of processing a digitally modulated signal of interest comprises passing the digitally modulated signal through a modem having an equalizer to generate an equalizer output signal.

3. The method according to claim 2, wherein the step of processing the signal of interest to generate a decision error comprises passing the equalizer output signal through a decision mechanism to generate a decision mechanism output signal such that the decision error consists of a difference between the equalizer output signal and the decision mechanism output signal.

4. The method according to claim 3, wherein the decision mechanism comprises a signal slicer.

5. The method according to claim 1, wherein the step of processing a digitally modulated signal of interest comprises processing a signal selected from the group consisting of a PAM signal, a PSK signal, and a QAM signal.

6. The method according to claim 1, wherein the step of regenerating the spurious signal in response to the decision error comprises passing the decision error through a phase locked loop to regenerate the spurious signal and further to ensure the regenerated spurious signal frequency matches the actual spurious signal frequency.

7. The method according to claim 1, wherein the step of regenerating the spurious signal in response to the decision error comprises simple IIR filtering of the decision error when the decision error is solely a constant value signal.

8. A system for removing a discrete spurious signal, the system comprising:
   an equalizer operational to digitally modulate a signal of interest, together with a spurious signal such that any inter-symbol interference is substantially eliminated, leaving only the signal of interest impaired by the spurious signal and some white noise;
   a decision mechanism operational to process the signal of interest impaired by the spurious signal and some white noise such that the difference between the equalizer output and the decision mechanism output is a decision error comprising the spurious signal and the white noise;
   a spurious signal regenerator operational in response to the decision error to regenerate the spurious signal such that the regenerated spurious signal frequency matches the actual spurious signal frequency;
   a first complex frequency converter operational to frequency shift the digitally modulated signal of interest along with the spurious signal in response to the regenerated spurious signal;
   a high pass filter operational to filter out the frequency shifted spurious signal; and
   a second complex frequency converter operational to frequency shift the digitally modulated signal of interest back to its original frequency devoid of the spurious signal.

9. The system according to claim 8, wherein the decision mechanism comprises a signal slicer.

10. The system according to claim 8, wherein the spurious signal regenerator comprises a phase locked loop.

11. The system according to claim 8, wherein the spurious signal regenerator comprises an IIR filter when the regenerated spurious signal comprises a constant value signal.

12. The system according to claim 8, wherein the signal of interest is selected from the group consisting of a PSK signal, a PAM signal, and a QAM signal.

13. A method of removing a discrete spurious signal from a desired signal, the method comprising the steps of:
   eliminating substantially any inter-symbol interference associated with the desired signal and the spurious signal;
   generating a decision error subsequent to substantially eliminating the inter-symbol interference, wherein the decision error comprises the spurious signal;
   regenerating the spurious signal in response to the decision error such that the spurious signal frequency matches the original spurious signal frequency and generating an output signal there from;
   frequency shifting the desired signal along with the spurious signal in response to the PLL output signal;
   filtering out the frequency shifted spurious signal; and
   frequency shifting the desired signal back to its original frequency.

14. The method according to claim 13, wherein the step of substantially eliminating any inter-symbol interference comprises passing the signal of interest, together with the spurious signal through an equalizer.

15. The system according to claim 13, wherein the step of regenerating the spurious signal spurious comprises filtering the decision error via an IIR filter when the regenerated spurious signal comprises a constant value signal.

16. The method according to claim 13, wherein the step of generating a decision error comprises passing the signal of interest impaired by the spurious signal and some white noise through a decision mechanism.

17. The method according to claim 16, wherein the decision mechanism comprises a signal slicer.

18. The system according to claim 13, wherein the desired signal selected from the group consisting of a PSK signal, a PAM signal, and a QAM signal.

* * * * *